United States Patent

Collins

[15] 3,641,303
[45] Feb. 8, 1972

[54] METHOD AND APPARATUS FOR CONTINUOUSLY MAKING TRUSS ELEMENTS

[72] Inventor: Howard W. Collins, Middletown, Ohio

[73] Assignee: Integrated Building Industry, Inc., Middletown, Ohio

[22] Filed: Jan. 26, 1970

[21] Appl. No.: 5,732

[52] U.S. Cl.................................................219/56, 219/80
[51] Int. Cl.................................................................B23k 1/00
[58] Field of Search..................219/80, 117 HD, 103, 56, 57, 219/58

[56] References Cited

UNITED STATES PATENTS

| | | | |
|---|---|---|---|
| 3,164,891 | 1/1965 | Gier, Jr. | 219/58 X |
| 3,219,066 | 11/1965 | Smith | 219/56 X |
| 3,288,977 | 11/1966 | Keller | 219/79 |
| 3,487,861 | 1/1970 | Fahrenbach | 219/56 X |
| 3,051,824 | 8/1962 | Wilson | 219/117 HD |
| 2,423,870 | 7/1947 | Blessing | 219/117 HD |
| 2,881,304 | 4/1959 | Dobson et al. | 219/117 HD |

Primary Examiner—J. V. Truhe
Assistant Examiner—Hugh D. Jaeger
Attorney—Wood, Herron & Evans

[57] ABSTRACT

A method and apparatus for continuously making truss elements in successively formed unit lengths from supplies of web forming and chord-forming strip. A unit length of supporting web is shaped at a die station while in position overlying a longitudinal portion of chord member formed of the chord forming strip. The web is joined at a welding station by resistance welding to the chord. The shaping of the unit length of web imparts to the web a pair of alternate opposite bends separated by straight portions. The bends include flat portions for joining to chord members and the straight portions between the bends are shaped to a curved cross section to provide rigidity. The chord member is provided with outwardly projecting ribs which melt to form the weld when pressed between resistance welding electrodes. The forming dies and welding heads move from the path of the truss element as the truss element is intermittently advanced by a three-latch advancing mechanism.

40 Claims, 11 Drawing Figures

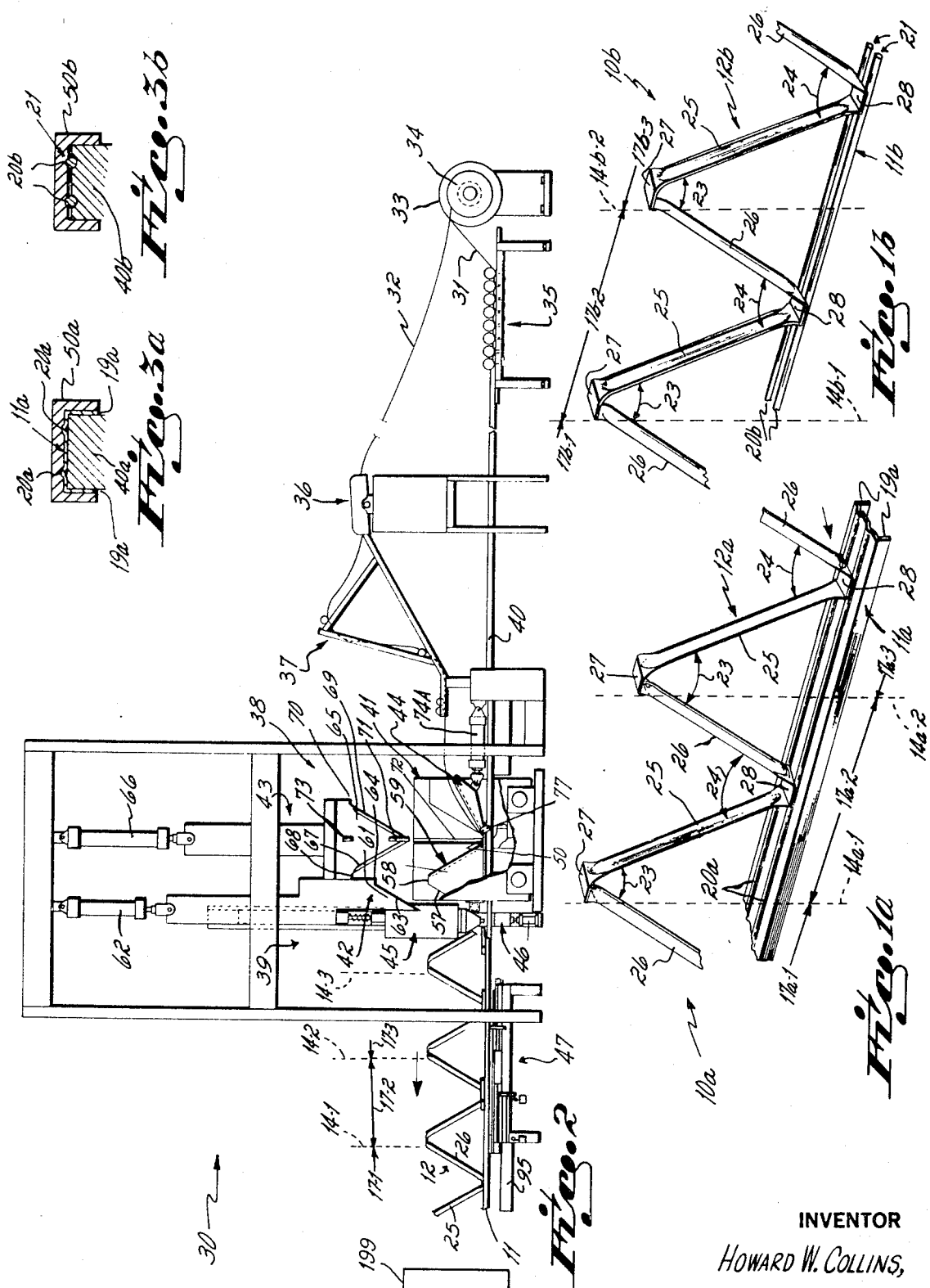

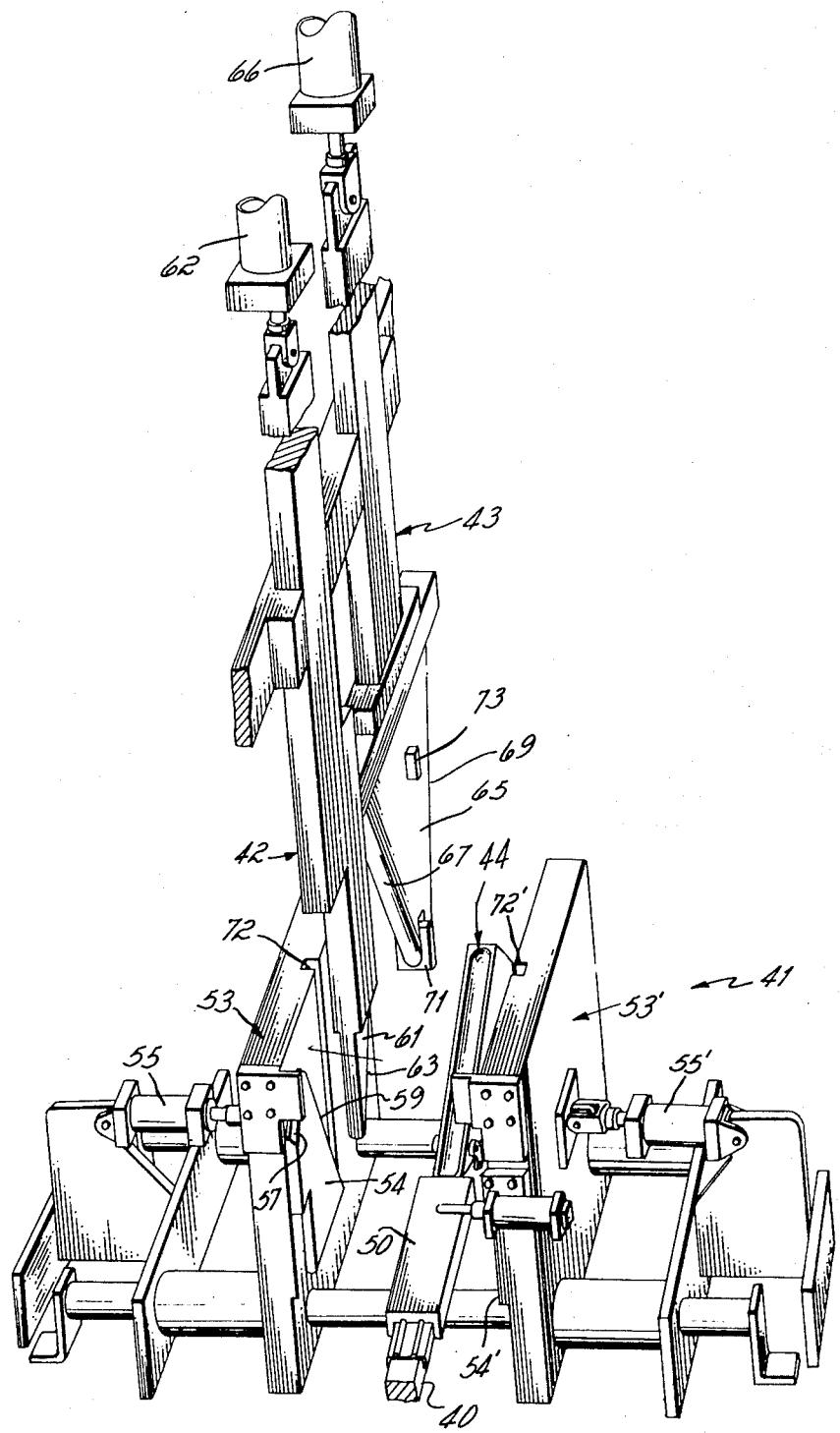

PATENTED FEB 8 1972 3,641,303
SHEET 3 OF 3
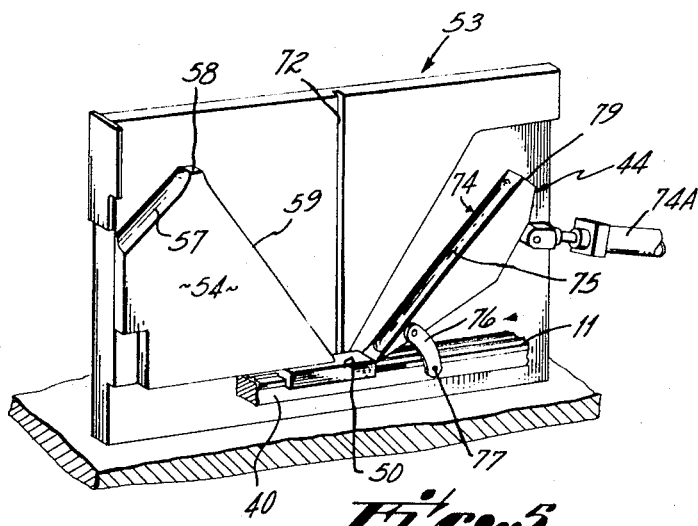
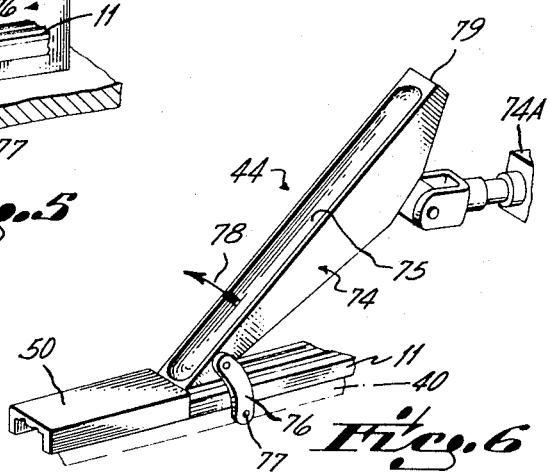
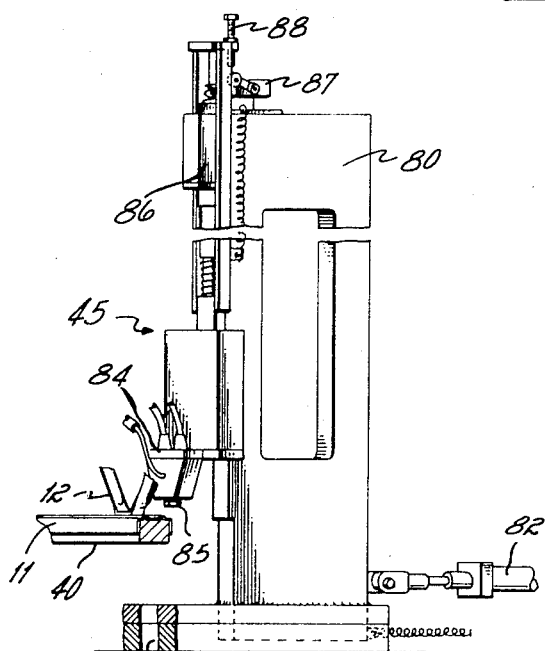
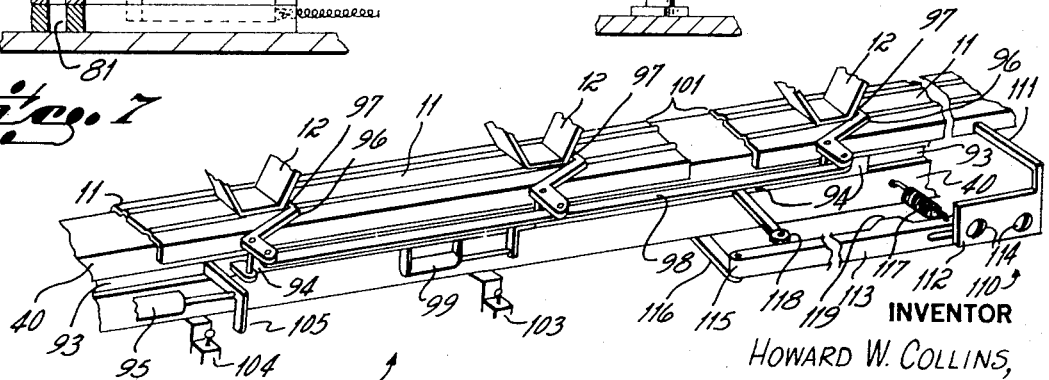
INVENTOR
HOWARD W. COLLINS,
BY
Wood, Herron and Evans
ATTORNEYS

3,641,303

METHOD AND APPARATUS FOR CONTINUOUSLY MAKING TRUSS ELEMENTS

This invention relates to the making of truss elements and, more particularly, to a novel method and apparatus for continuously making truss elements and to a truss element made thereby.

A truss element is a structural article having one or more chord members to which a supporting web or latice is secured. According to the prior art, a self-sufficient truss element or joist has two chord members separated by a supporting web. In common applications, the upper chord member carries a compressive load and the lower chord member carries a load in tension. A floor or other surface can be used to form the upper chord member by being secured directly to the supporting web.

The truss elements of the prior art are customarily manufactured by preforming both the chord and web members, then cutting these members in appropriate lengths and securing them together. Such methods of manufacture involve a plurality of separate steps, require considerable space, consume large amounts of time, and require a relatively large number of workmen. The cost of such operations is commensurate with these factors. The machinery required to perform such operations itself occupies considerable space and is relatively expensive. Furthermore, such machinery is relatively inflexible in that the variety of sizes of truss elements which it can produce is restricted to its built-in parameters. Some machines of the prior art employ a plurality of die stations and welders to form a complete length of truss element. That such machines have the drawbacks mentioned above is apparent. Other machines provide dies or welders which act at points along a moving stock and, moreover, attempts to continuously make truss elements have required machinery of considerable longitudinal extent and have thus not materially reduced the space requirement nor simplified the truss-making operation.

Accordingly, the principle object of the present invention is to provide a flexible and efficient method and apparatus for making truss elements with an exceptional saving in space, time and labor; and also to provide an economical and structurally sound and superior truss element which can be made by such a method and apparatus. More particularly, an object of the present invention is to provide a method and apparatus for continuously making truss elements in successively formed unit lengths by shaping a web member while in position adjacent a chord member and welding the two members together, with the further object of providing a truss element having a cooperating structure which facilitates its manufacture.

The present invention is predicated in part upon the concept of using a stationary die and welder which act during a dwell in the feed of a truss element to form a length of the truss element by bringing a chord member and a web-forming strip together and shaping the web while in position adjacent the chord member to form a length of supporting web, and then resistance welding the web and chord member together. To facilitate in its manufacture, the truss element of the present invention includes outwardly projecting ribs carried by one of the welding surfaces, the ribs being designed to melt to form the weld.

Repetitive operation of the method and apparatus of this invention provides for the continuous manufacture of truss elements in any number of successively formed unit lengths. A unit length of web is formed by shaping a web-forming strip which has been fed into the position which it will finally attain as a shaped web. The strip is shaped to a pair of alternate opposite bends, an upper bend and a lower bend. Horizontal flat portions are formed in these bends to facilitate joining of their outside surfaces to a chord member. The web shaping is accomplished by dies provided on opposite sides of the positioned web forming strip to form it into the supporting web. The welding is accomplished by a pair of welding heads positioned to weld the last previously formed unit length of web to the chord. These dies and welding heads are moveable out of the path of the web transverse to the feed of the truss to allow the truss to be fed in a continuous manufacturing operation. To provide for a more rigid structure, the dies shape the web to a curved cross section in the straight portions between the bends. The chord carries outwardly projecting ribs, preferably in the form of two longitudinally extending projections from a sheet or simply two circular rods defining the ribs. Due to the relatively small cross-sectional area which these ribs present to the welding current they melt in a resistance welding operation to form the weld which joins the web to the chord member. The welding is performed under pressure to urge the web and chord together as the ribs melt to form a sound weld joint. A truss-advancing mechanism having plural latches will provide for continuous feed of plural truss elements for their continuous manufacture.

One of the principle advantages of the method and apparatus of the present invention is that truss elements of a variety of sizes can be made on a simple and compact apparatus. A further advantage is that truss elements can be manufactured in a variety of lengths with a minimum of handling. These advantages are due in part to the bringing of the truss forming material into its ultimate position for forming and the repeating of that forming at the same station upon different unit lengths of the truss element. Another reason for these advantages is due in part to the structure of the truss elements themselves facilitating the welding operation.

These and other objects and advantages of the present invention will be more readily apparent from consideration of the following detailed description of the drawings illustrating preferred forms of truss elements and the method and apparatus for making them which embody the principles of the present invention. Many of the details of the method, apparatus and product of this invention do in themselves greatly enhance the general objects of this invention and provide special advantages. These features are discussed in more detail below in connection with the description of the drawings.

DESCRIPTION OF THE DRAWINGS

In the drawings:

FIG. 1a is a perspective view illustrating a segment of one form of truss element embodying principles of the present invention;

FIG. 1b is a perspective view illustrating a section of another form of truss element embodying principles of the present invention;

FIG. 2 is a side elevational view in partially diagrammatic form of one embodiment of a truss making apparatus embodying principles of the present invention;

FIGS. 3a and 3b are transverse cross-sectional views taken through the anvil area of the apparatus of FIG. 2 corresponding to the truss element embodiments of FIGS. 1a and 1b respectively;

FIG. 4 is a perspective view, looking generally upstream, of the upper die members associated with the apparatus of FIG. 2;

FIG. 5 is a perspective view showing a portion of the lower dies of the apparatus of FIG. 2;

FIG. 6 is an enlarged perspective view of a portion of the dies of FIG. 5;

FIG. 7 is a perspective view showing the upper welding head assembly of the apparatus of FIG. 2;

FIG. 8 is a perspective view showing the lower welding head assembly of the apparatus of Fig. 2; and FIG. 9 is a perspective view showing an advancing mechanism for advancing a truss element through the apparatus of FIG. 2.

Referring first to the truss element of the present invention, two embodiments are shown in FIGS. 1a and 1b. In referring to these figures, numerals which appear in the specification without letter suffixes refer generically to corresponding elements in both embodiments while those numerals which appear with the letter suffixes "a" and "b" refer to one or the other of these specific embodiments of which embodiment "a" is shown in FIG. 1a and embodiment "b" is shown in FIG. 1b.

Each of the FIGS. 1a and 1b shows a truss element 10 formed of two members, a lower chord member 11 and a supporting web member 12. The two members 11 and 12 are formed from individual supplies of continuous stock, the truss element 10 being continuously made in successive unit lengths by the method and apparatus of the present invention. A unit length of truss element is that portion of truss element which is formed by one of the recurring cycles of the method and apparatus of the present invention, the length of the truss element being thus determined by the number of recurring cycles which go into the continuous forming of such a truss element. A unit length is designated as the space between the dash lines 14–1 and 14–2 in the embodiments shown in FIGS. 1a and 1b. This dimension, in practice, might be 12 or 16 inches. Of course these lines can be arbitrarily placed at any two similarly spaced positions along the length of the truss. It is preferred that a unit length span only a single pair of bends of the web but it is contemplated according to one of the broad aspects of the present invention that eight more or less structure might be encompassed by a unit length. The separate unit lengths of truss are designated 17–1, 17–2, . . . .

The lower chord member 11 of truss element 10 may have any number of forms depending on that which is most suitable for the particular application to which the truss element is intended. The embodiment 10a shown in FIG. 1a is described in U.S. Pat. No. 3,447,278 which shows a channel shaped lower chord member 11a having downwardly extending leg portions 19 and raised longitudinally extending ribs 20a. These legs and ribs are integral with the sheet of which the channel shaped chord member 11a is formed. The ribs 20a project upwardly from the chord member 11a a distance of approximately one-sixteenth inch. These ribs 20a facilitate the resistance welding process which joins the chord member 11a to the web member 12.

The ribs 20 of the lower chord member 11 do provide an important advantage in the resistance welding process and enhance the continuous manufacturing of the truss elements. The exact configuration of these ribs is not so important but it is important that they project outwardly from the lower chord member 11 to provide a contact of reduced cross section with the web to provide a contact of reduced cross section with the web 12. This will concentrate the welding current in the ribs 20 to cause the ribs to melt and form the weld. It is noted however that longitudinally extending ribs or at least ribs aligned in longitudinal rows provide a manufacturing advantage in that they are easily protected during the web forming operation which will be apparent from the explanation of FIG. 3 below.

The lower chord member 11b of the embodiment 10b shown in FIG. 1b comprises two parallel longitudinally extending rods 21 of which the uppermost portions constitute the ribs 20b. The lower chord member 11b of this embodiment represents a considerable saving in material and is particularly useful in applications where the truss element 10b will be joined to an upper chord member such as a floor panel, etc., prior to undergoing any significant bending moments. The embodiment in FIG. 1a, on the other hand, is somewhat resistant to bending moments even in the absence of an upper chord member but at the cost of slightly more material.

The supporting web member 12 of the truss member 10 is formed from a continuous strip of material while in position overlying the lower chord member 11. The forming of the web 12 imparts opposite alternate bends 23 and 24 separating straight portions 25 and 26. The bends 23 encompass horizontal flat portions 27 which are provided for joining to an upper chord member (not shown). Similarly, the bends 24 encompass horizontal flat portions 28 which contact the ribs 20 of the lower chord member 11 for welding thereto. The straight portions or legs 25 and 26 are formed to a curved cross section in order to increase the rigidity of the structure. These members are formed in the illustrated embodiments to curved cross sections which are generally U-shaped and concave upward, but these cross sections might also be v-shaped, concave downward, or be formed to other patterns which increase the rigidity.

The apparatus of the present invention is best understood by reference to the simplified and somewhat diagrammatic representation of FIG. 2. The truss making apparatus is illustrated generally at 30 and operates to continuously form the truss element 10 shown emerging from the machine 30 at the left in FIG. 2. The truss element 10 is continuously formed in unit lengths 17 by the machine 30 from supplies of chord-forming strip 31 and web-forming strip 32. The unit lengths of truss element 17 are numbered in the order in which they are formed 17–1, 17–2, . . . . The supplies are illustrated as rolls 33 and 34 respectively at the right in FIG. 2. These supplies need not be in roll form. It may be desirable, for example, in cases of the chord member material 31 being very stiff, to supply the chord forming strip 31 in discrete lengths of either arbitrarily long or precut sections. Further, a continuous strip may be formed by joining discrete lengths of stiff strip to form a continuous length of chord forming strip. Another alternative, illustrated in FIG. 2 for the production of the truss element embodiment 10a shows a roll-shaping apparatus 35 which continuously shapes the channel-shaped chord member 11a from a roll supply 33 of strip 31.

Means may be provided to feed the strip 31 into the machine and such means would be particularly useful to start the feeding of the strip 31 at the beginning of an operation. However, once the first unit length has been formed, the lower chord strip 31 will be drawn into the machine 30 where it becomes chord member 11 as the successive operations progress.

Feeding of the web-forming strip 32 which is generally lighter in weight and more flexible than the chord forming strip is accomplished by the strip feeder 36 which feeds the strip 32 into the loop 37. The loop 37 provides slack for intermittent gravity feed without the need to accurately run the feed rolls on an intermittent basis. The gravity feed provides forward thrust on the strip 32 to insure that the formed web will not be deflected by tension of the strip 32 upon advancing of the truss 10 through the machine 30. The web-forming strip 32 is fed into the truss making apparatus 30 in a position overlying the chord member 11 to be shaped into the supporting web 12 while in position overlying the chord member 11 and to then be resistance welded to the chord member 11 to form a unit length 17 of truss element 10.

The truss making machine 30 has two operating stations at which the different truss-making functions are performed on adjacent unit lengths 17 of the truss element 10. As can be seen in FIG. 2 the web-shaping operation in which the supporting web 12 of the truss element 10 is shaped occurs at a first station 38 upon one of the unit lengths 17 of the truss element 10, while the resistance welding of the previously shaped unit length 17 of the web 12 to the lower chord 11 occurs at a second station 39. It is not important to the broad concept of the present invention that the functions be so divided between two such stations, but such functions could be performed at a single station either simultaneously or successively or could be distributed among more than two stations. However, certain advantages are realized in the present embodiment in separating welding and web forming functions, such as the simplification of the die structure and the prevention of the ash usually incident to resistance welding from fouling the forming dies. It is a concept of the present invention that each such function in itself be performed successively on different sections, for example different unit lengths 17, of a truss element 10 to continuously form a truss element comprising a plurality of such sections.

The general components of the truss making machine 30 are the lower chord supporting track 40, a split lower die assembly 41, (FIG. 4) a holddown die assembly 42, an upper die assembly 43, a pivotal lower die assembly 44, an upper welding head assembly 45, a lower welding head assembly 46, and a truss advancing mechanism 47.

The track 40 is a horizontal track extending longitudinally through the machine to support the lower chord member 11. The track 40 is provided with means to constrain the chord member 11 to guide it through the machine 30. The track 40 is specially shaped to correspond to shapes of particular chord members 11 as shown in FIG. 3a in relation to chord member 11a and in FIG. 3b in relation to chord member 11b. Also shown in FIGS. 3a and 3b is an anvil 50 which covers the chord member 11 in the region of the first station 38 directly beneath the apex of the upper die assembly 42 to protect the ribs 20 during the forming of the web 12, and to serve as an anvil for the forming of the lower flat portions 28 of the web 12. The anvil 50 is provided with interior longitudinal grooves corresponding to the ribs 20 of the chord 11.

The split lower die assembly 41 is best shown in FIG. 4. The assembly 41 includes a pair of split lower die portions 53 and 53'. The die portions 53 and 53' are normally spaced apart and on opposite sides of the track 40. Each die portion 53 and 53' carries a forming block 54 and 54' respectively. These die portions 53 and 53' move together laterally to bring the forming blocks 54 and 54' together directly overlying the track 40 and anvil 50 for the forming of the web 12 while the web 12 is in position overlying the chord 11 supported on the track 40. The die portions 53 and 53' are retractable laterally to withdraw the forming blocks 54 and 54' from beneath the formed web 12 to permit the truss element 10 to be advanced one unit length on the track 40 for the forming of the next successive unit length 17. The lateral movement of the lower die portions 53 and 53' is accomplished by the respective action of the hydraulic cylinders 55 and 55' which are conventionally connected to a suitable source of hydraulic fluid. Pneumatic or other actuating means may be used in place of the hydraulic cylinders 55 and 55' to move the die portions 53 and 53'.

The details of the die portion 53 are more clearly shown in FIG. 5. (The die portion 53' is for all practical purposes identical to die portion 53; thus reference to a detail in the specification with a primed number refers to a detail of die portion 53' corresponding to a detail of die portion 53 as set forth below). The forming block 54 has three forming surfaces, a forward forming surface 57 against which the previously formed straight web section 26 is clamped, a top flat surface 58 which forms the upper flat portions 27 of the web 12, and a rear forming surface 59 against which the straight portion 25 of the web 12 is formed. The anvil 50 against which the lower flat portion 28 of web 12 is formed is positioned overlying the chord 11 at the lower tip of die surface 59.

The hold down die assembly 42 includes a hold down die 61 shown in FIGS. 2 and 4. The die 61 is reciprocable vertically by means of a hydraulic cylinder 62. The die 61 has an inclined surface 63 and a horizontal flat surface 64 which mate with the forming blocks 54 and 54' at surfaces 57, 57' and half of 58, 58' respectively. The die 61 is normally maintained remote from the web in a position overlying the track 40, and is actuated to descend when the forming blocks 54 and 54' are in position overlying the track 40 to clamp a previously formed straight portion 26 of a unit length of truss element for the welding of the web of that unit length of truss element 10 to the chord element 11 at the second station 39, and for the forming of the web 12 of the next successive unit length of truss element 10 at the first station 38.

The upper die assembly 43 carries a vertically reciprocable wedge shaped upper die 65 which is driven by means of a hydraulic cylinder 66. The forward portion of the die 65 is provided with a convex inclined surface 67 and a flat surface 68 which mate with the concave surfaces 59, 59' and the other half of the surfaces 58, 58' not engaged by flat 64 of hold down die 61, respectively of the forming blocks 54 and 54'. The rearward portion of the die 65 is provided with similar convex and flat surfaces 69 and 70 respectively. The die 65 is provided with a block 71 at the lower tip of the wedge. This forming block cooperates with the anvil 50 to form the flat portion 28 of the web 12. This block 71 is wider than die 65, the sides forming tongues which fit into grooves 72 and 72' of the die portions 53 and 53' while similar tongues 73 are carried by the die 65 in vertical alignment with the tongues of the block 71 to guide the die 65 to ride in the grooves 72, 72' to guide the die 65 vertically in relation to the forming blocks 54 and 54'.

As shown in FIGS. 4, 5 and 6, the pivotal die assembly 44 includes a lower die 74 having an inclined die surface 75 which mates with the rearward surface 69 of the upper diehead 65 to form the straight portion 26 of the web 12. The die 74 also has a flat die surface 79 which mates with the die surface 70 of die 65 to form the first half of the upper flat 27 of web 12. The die 75 is mounted at its lower end by an arm 76 to a point 77 of the track 40 so that is pivots about point 77 to prescribe an arc 78. The die 74 is driven about point 77 by actuation of a hydraulic cylinder 74A. The motion of the die 74 in this stroke tends to pinch the web-forming strip down against the anvil 50 to form the corner of the flat portion 28 of the web 12.

In some cases, if the angle between the straight portions of the web and the chord are shallow enough, the pivotal die can be replaced by a portion of the split die halves 54 and 54' or by a one piece stationary die.

The inclined surfaces of the dies are provided with curved surfaces to so shape the web portions 25 and 26 for rigidification of the web 12. In the embodiment shown, this curve is an upwardly concave U-shape in the die surfaces 57, 59, 61, 67, 69 and 75.

Turning now to the welding assemblies which operate at the second station 39 of the machine 30, the upper and lower welding head assemblies 45 and 46 are positioned adjacent the track 40 one unit length of truss element downstream from the upper die assembly 43. These welding head assemblies 45 and 46 cooperate to weld the last previously formed unit length of truss element, at a flat portion 28 of the web 12 to the ribs 20 of the lower chord member 11.

The upper welding head 45 is best shown in FIG. 7. The welding head assembly 45 includes an upright support 80 positioned to one side of the track 40 adjacent the welding station 39. The support 80 is laterally moveable in a track 81 by the actuation of a hydraulic cylinder 82. The support 80 carries a vertically moveable upper welding head 84 carrying an electrode 85. The welding head 84 is moved laterally into position overlying a flat 28 of the web 12 by actuation of cylinder 82 to move the support 80 laterally in track 81. A hydraulic cylinder 86 carried by the support 80 operates to force the welding head 84 downwardly a fixed distance to bring the electrode 85 into contact with a flat 28 of the web 12. This fixed distance is maintained by a limit switch 87 mounted on the support 80 which cooperates with an adjusting screw 88. The limit switch 87 is connected so as to stop the cylinder 86. The screw 88 is vertically moveable with head 84 to trip the limit 87 and thereby to stop the motion of the head 84 in its downward extent. The screw 88 is adjustable to tolerate varying extensions of the electrode 85 from the head 84 which are caused by burning and subsequent regrinding of the electrode 85.

The track 40 carrying the truss element 10 is yieldably supported at the welding station 39 to move downwardly at least a distance equal to the height of the projecting ribs 20 of the chord 11. The truss element 10 is caused to yield downwardly a distance under the pressure of the upper welding head 84. As shown in FIG. 8 the track 40 is provided with a gap at the welding station to allow the lower welding head assembly 46 to bring a welding electrode into contact with the under portion of the chord member 11. The lower welding head 90 carries a block electrode 91. During a welding operation this electrode is urged against the underside of the lower cord member 11 by a hydraulic cylinder 92 which includes a hydraulic accumulator. The accumulator builds up pressure as the upper welding head 84 downwardly deflects the truss element 10. This accumulator functions to cause the lower welding head 92 to maintain upward pressure on the chord member 11 throughout the welding operation. Since the current path from the electrode 85 to electrode 91 encounters the smallest conductor cross section at the contacting surfaces between the tips of the ribs 20 of the chord member 11 and the flat 28 of the web 12, the ribs 20 will heat fastest and melt to form the weld. As these ribs melt the chord 11 is urged upwardly against the web 12 through energy built up in the accumulator of the cylinder 92, thereby welding the web 12 flush against the chord 11.

The purpose of the ribs 20 of the lower chord member 11 could also be achieved by alternatively providing projections on the flat portions 28 of the web 12. Although the welding operation can be done in other ways, the above mentioned method utilizes simple block electrodes and gives a metallurgically and mechanically sound connection.

The feed of the truss member 10 through the machine 30 is accomplished by the advancing mechanism 47 which is best illustrated in FIG. 9. The advancing mechanism 47 operates to intermittently advance the truss element 10 through the machine 30 in unit length distances. This advancing mechanism 47 allows the stationary die and welder assemblies to act during dwells in feed to continuously manufacture a truss element in unit length sections. Referring to FIG. 9, a reciprocating hydraulic cylinder 95 having a stroke of slightly greater than one unit length of truss element is fixed to a slide rod 94 which carries three ganged ratchet-type pawls or latches 96. The rod 94 is mounted in a slideway 93 on the side of track 40 and the cylinder 95 is mounted to track 40. The three latches 96 are pivotally mounted to slide bar 94 and are spaced a distance corresponding to one unit length of truss element to engage the truss 10 at corresponding points 97 along each unit length at the weld juncture between the web 12 and the chord 11. Thus, actuation of the cylinder 95 is effective to move the latches 96 and hence the truss one unit length. In order to permit the latches 96 to return without interference from the truss, a latch release mechanism is employed. To this end, a latch release cylinder 99 is carried by the slide bar 94 and has its piston rod connected to latch release bar 98. Each of the latches 96 is pivotally connected to bar 98 such that actuation of the cylinder 99 and hence bar 98 causes all of the latches to pivot simultaneously either into or out of engagement with the truss elements at the points 97. By operation of the cylinder 99 the latches 96 can be caused to release the truss element 10 at the end of a feed stroke so that they will clear the web 12 upon a return stroke of the cylinder 95. At the end of a return stroke, the cylinder 99 is actuated to again engage the latches 96 with truss element 10 for a subsequent feeding operation. At the beginning of the feed stroke of the advancing mechanism 47 an easement feature is provided. This feature is built in to the hydraulic controls and it is effective primarily to slowly accelerate the motion of cylinder 95 to reduce the shock which would otherwise be caused by attempting to move the truss member 10 at full speed immediately be engagement of the latches 96 at the points 97. This is particularly important when long truss elements are being made which might have considerable mass. Attempting to initiate movement at full speed of such heavy truss elements might damage the web or tear the weld. This easement feature is accomplished by hydraulic switching. The easement mechanism includes a pair of valves 103 and 104 which are suitably connected in the fluid supply line to cylinder 95. These valves 103 and 104 are actuated by a cam 105 carried by the bar 98 and positioned to be actuated by the cam 105 at the beginning and end of the truss-advancing stroke. Easement mechanisms such as this are conventional and any of many types may be employed, for example, an acceptable mechanism for this purpose is that commonly employed in a hydraulic elevator.

The three latches 96 provide a means for completely withdrawing a formed truss element from the machine a distance of at least three unit lengths from the forming station and also to provide for the smooth feeding for the continuous manufacture of a series of truss elements formed from measured discrete lengths of chord-forming strip. This application is represented in the drawings by a gap 101 in the chord 11 in FIG. 9.

Another feature contemplated by the present invention with reference to the gap 101 is the provision for tailoring the total length of truss element a fraction of a unit length one way or the other without requiring that the set unit length dimension be changed and while still allowing the continuous manufacture of a series of such truss elements. This can be done by varying the gap 101 and then cutting the web at the corresponding flat 27 at a cutting station 199 (FIG. 2). The inclination or length of the last leg of the web 12 can be adjusted in a subsequent operation if desired.

Registration means 110 are provided to control the size of the gap 101. The means 110 include a stop 111 mounted adjacent the track 40 near the chord member 11. The stop 111 is moveable into the path of the chord member 11 to provide an abutment against which the leading end of the chord member fed into the machine is registered. The stop 111 retracts from this path to allow the truss element to be advanced by the advancing means 47. More specifically, the stop 111 is fixed to the block 112 which is adjustably carried by arm 113 to permit control of the size of the gap 101. The block 112 is slidable along the arm 113 and can be locked at any position by tightening of the nuts 114. The arm 113 is pivotably mounted at point 115 to a bracket 116 which is fixed to the track 40. A spring 117 is connected between the arm 113 and the track 40 to urge the arm 113 toward the track 40. The stop 111 thus normally rides against the chord member 11 and drops into the path of the next chord member when the previously made truss element passes. The stop 111 is moved out of this path by the coaction of a roller 118, mounted on the slide bar 94, and the cam surface 119 of the arm 113. This particular registration means has the advantage of mechanical simplicity, but hydraulic or electrical means for moving the stop 111 can also be used. When a chord member such as 11b of FIG. 1b is employed, the stop 111 must register both of the rods 21. This can be done by either extending the stop 111 and moving it through a greater distance or by providing a duplicate stop on the opposite side of the track 40.

A cutoff mechanism, not shown, may be provided downstream of the welding station to cut off a length of truss element so that continuous operation of the machine may be maintained during the making of a series of truss elements.

The hydraulic and electrical controls of the present machine are conventional and may easily be constructed by anyone skilled in the art from the present description. While a direct hydraulic fluid supply system which normally supplies fluid at a constant pressure built up against a release valve would be adequate for the purpose of this machine, it is preferred that use be made of sequence valves which are combinations of a pressure release and check valves. Such valves require that considerably less power be expended and consequently the machine of the present invention may be operated at a relatively low average power level.

In operation, the strips 31 and 32 are fed into the machine 30 and it is usually convenient in the present embodiment to manually operate the machine through a few cycles to form the first truss element unit length 17–1. Automatic initial feeding means are preferred for more efficient use of the machine but such automatic means are not part of the present invention. Turning to the cycle of operation, first, the split lower die assembly 41 is actuated to laterally move the forming blocks 54 and 54' into position overlying the chord member 11 and underlying the web 12. The hold down die assembly 42 is then actuated to clamp the web 12 against the forming blocks 54 and 54'. The upper die assembly 43 is then actuated causing the die 65 to descend forming the straight portion 25 of the web 12 between the die surfaces 59, 59' and 67, the flat 28 of web 12 between the die surfaces 71 and the anvil 50, and the second half of the flat 27 between the die surfaces 58, 58' and 68. The pivotal forward die assembly 74 is then actuated to form the straight portion 26 of the web 12 between die surfaces 69 and 75 and to form the first half of the flat 26 of web 12 between the die surfaces 70 and 79. Simultaneous with the forming operation which is carried on at the first station 38, the welding operation is performed at the second station 39. In the welding operation, the upper welding head assembly 45 is laterally shifted over the track 40 and brought down against the upper surface of the flat 28 of the web 12 depressing it against the pressure of the lower welding head 46 to weld the web 12 to the chord member 11 of the last previously formed unit length, e.g., 17-1 of truss element. Successive cycles of operation will form additional unit lengths 17-2, 17-3, ..., of truss element. And thereby the continuous making of a truss element of any length is provided.

The entire disclosure of the patent application of Howard W. Collins, Ser. No. 512,565, filed Dec. 8, 1965, now U.S. Pat. No. 3,447,278, is hereby expressly incorporated into the present specification to become part thereof.

What is claimed is:

1. An apparatus for continuously making truss elements of arbitrary length, said truss elements having a linear chord member and a supporting web member joined to said chord member, said web member having bends of alternating opposite sets with the bends of one of said sets being welded to said chord member, and said web member being formed of flat strip material shaped to a contoured transverse cross section along the lengths between said bends; said apparatus comprising:
   a forming station having a material guiding path extending therethrough from a feeding end upstream of said station to a delivery end downstream of said station;
   means at said feeding end, for feeding linear chord member forming material into said station along said path, and for feeding flat web forming strip material into said station along said path adjacent said chord member forming material;
   said forming station including means for successively forming unit lengths of truss element from said chord and web member forming materials;
   means at said delivery end for engaging said formed truss element and for advancing it step by step, in one unit length distances, along said path; and
   said forming station including:
   a. cooperating die sets for shaping unit lengths of supporting web, said sets having forming surfaces for imparting said bends to said web and having forming surfaces for imparting said contoured cross sections to the lengths between the bends of said web,
   b. cooperating welding heads for resistance welding the bends of said one of said sets to said chord member,
   c. said die sets being operative to impart both said bends and said contours to a given unit length during a single dwell between consecutive ones of said advancing steps, and
   d. said welding heads being positioned along said path to operatively engage one of said bends during said dwells.

2. An apparatus according to claim 1 wherein:
   said welding heads are positioned along said path a distance of one unit length downstream from the die surfaces which shape the bend of the web which is to be welded to the chord member; and
   said welding heads operating to weld a given bend during a dwell immediately succeeding the dwell during which said given bend was formed.

3. An apparatus according to claim 1 wherein said die sets comprise:
   a first die of said first set positionable between said chord and web-forming materials; and
   a second die of said second set positioned opposite said web-forming material from said chord-forming material and relatively movable toward said first die in the plane of said members.

4. An apparatus according to claim 3 wherein said first die includes a pair of die halves movable from rest positions on opposite sides of the plane of said members into operative position in said plane between said members.

5. An apparatus according to claim 3 wherein:
   said first die includes a forming block having an apex over which one of said bends is formed;
   said second die includes a forming block having an apex over which an opposite one of said bends is formed; and
   said forming blocks being positioned one-half of a truss element unit length apart along said path.

6. An apparatus according to claim 3 wherein said first die set includes a pivotal die having an arcuate forming stroke away from said chord member.

7. An apparatus according to claim 3 wherein said dies operate simultaneously to shape, to its ultimate configuration, an entire unit length of web, including an aggregate of two complete bends and two contoured lengths between bends.

8. Apparatus according to claim 1 further comprising a clamp to grip a previously formed unit length of web during said forming of said unit length of supporting web.

9. An apparatus according to claim 1 wherein said dies include flat forming surfaces to shape a flat portion in one of said bends of said web, said flat portion and said chord member presenting opposing welding surfaces.

10. An apparatus according to claim 1 wherein:
    one of said bends and said chord member present opposing welding surfaces; and
    one of said welding surfaces has outwardly projecting ribs for welding to the other of said welding surfaces whereby said chord member is welded to said web.

11. An apparatus according to claim 10 wherein said ribs are carried by said chord member.

12. An apparatus according to claim 11 wherein said first die set includes an anvil for preventing deformation of said ribs upon operation of said dies in shaping said web.

13. An apparatus according to claim 10 wherein said first die set includes an anvil having concave rib-receiving surfaces therein.

14. An apparatus according to claim 10 wherein:
    the tips of said ribs present a surface having less area than the corresponding length of said other of said welding surfaces; and
    said resistance weld is formed by the melting of said ribs.

15. Apparatus according to claim 14 wherein said welding heads include means for pressing said chord and web together through a distance of approximately the height of said ribs to form said weld.

16. Apparatus according to claim 14 wherein said ribs consist of two longitudinally extending ribs.

17. An apparatus according to claim 1 wherein said advancing means includes a plurality of latches for engaging respective points of different unit lengths of truss element, whereby said advancing means is operable to advance a continuous truss element having a gap in said chord member.

18. An apparatus according to claim 17 further comprising:
    a stop being mounted adjacent said path at said delivery end, said stop movable into the path of said chord member to provide for initial registration thereof, and to control said gap, and said stop being movable out of said path to permit the advancing of said truss element by said advancing means.

19. Apparatus according to claim 1 further comprising a cutoff station positioned downstream of said forming station whereby a plurality of truss elements can be continuously made.

20. An apparatus for continuously making truss elements of arbitrary length, said truss elements having a linear chord member and a supporting web member joined to said chord member, said web member having bends of alternating opposite sets with bends of one of said sets being welded to said chord member, and said web member being formed of flat strip material shaped to a contoured transverse cross section along the lengths between said bends; said apparatus comprising;
    a forming station having a material guiding path extending therethrough;

means for feeding linear chord member forming material and flat web-forming strip material into said station and for advancing said chord and web along said path through said station;

said forming station including means for successively forming unit lengths of truss element from said chord and web member forming material comprising:

a. cooperating die sets for shaping an entire unit length of supporting web to its ultimate shape adjacent a corresponding unit length of said chord member, said sets having forming surfaces for imparting said bends to said web and for imparting said contoured cross sections to the lengths between the bends of said web, and b. cooperating welding heads for resistance welding said bends of said one of said sets to said chord member.

21. An apparatus according to claim 20 wherein said die sets comprise:

a first die of said first set positionable between said chord and web forming materials; and a second die of said second set positioned opposite said web-forming material from said chord-forming material and relatively movable toward said first die in the plane of said members.

22. An apparatus according to claim 21 wherein said first die includes a pair of die halves movable from rest positions on opposite sides of the plane of said members into operative position in said plane between said members.

23. An apparatus according to claim 21 wherein:

said first die includes a forming block having an apex over which one of said bends is formed;

said second die includes a forming block having an apex over which an opposite one of said bends is formed; and said forming blocks being positioned one-half of a truss element unit length apart along said path.

24. An apparatus according to claim 21 wherein said first die set includes a pivotal die having an arcuate forming stroke away from said chord member.

25. apparatus according to claim 20 further comprising a clamp to grip a previously formed unit length of web during said forming of said unit length of supporting web.

26. An apparatus according to claim 20 wherein said dies include flat forming surfaces to shape a flat portion in one of said bends of said web, said flat portion and said chord member presenting opposing welding surfaces.

27. An apparatus according to claim 20 wherein:

said welding heads are positioned along said path a distance equal to an integral number of unit lengths downstream from the die surfaces which shape the bend of the web which is to be welded to the chord member.

28. An apparatus for continuously making truss elements of arbitrary length, said truss elements having a linear chord member and a supporting web member joined to said chord member, said web member having bends of alternating opposite sets with bends of one of said sets being welded to said chord member, and said web member being formed of flat strip material shaped to a contoured transverse cross section along the lengths between said bends; said apparatus comprising:

a forming station having a material guiding path extending therethrough;

means for feeding linear chord member forming material and flat web forming strip material into said station and for advancing said chord and web along said path through said station;

said forming station including means for successively forming unit lengths of truss element from said chord and web member forming material comprising:

a. cooperating die sets for shaping unit lengths of supporting web, b. one of said bends and said chord member present opposing welding surfaces, c. cooperating welding heads for resistance welding one of the bends of said web to said chord member, and d. one of said welding surfaces has outwardly projecting ribs for welding to the other of said welding surfaces whereby said chord member is welded to said web.

29. An apparatus according to claim 28 wherein said welding heads, when operative are positioned in the plane of said chord and web members.

30. An apparatus according to claim 28 wherein said ribs are carried by said chord member.

31. An apparatus according to claim 28 wherein:

the tips of said ribs present a surface having less area than the corresponding length of said other of said welding surfaces; and said resistance weld is formed by the melting of said ribs.

32. An apparatus according to claim 30 wherein:

said die sets have forming surfaces for imparting said bends to said web; and said first die set includes an anvil for preventing deformation of said ribs upon operation of said dies in shaping said web.

33. An apparatus according to claim 28 wherein:

said die sets have forming surfaces for imparting said bends to said web; and said first die set includes an anvil having concave rib-receiving surfaces therein.

34. Apparatus according to claim 28 wherein said welding heads include means for pressing said chord and web together through a distance of approximately the height of said ribs to form said weld.

35. An apparatus for continuously making truss elements of arbitrary length, said truss elements having a linear chord member and a supporting web member joined to said chord member, said web member having bends of alternating opposite sets with the bends of one of said sets being welded to said chord member, and said web member being formed of flat strip material shaped to a contoured transverse cross section along the lengths between said bends; said apparatus comprising:

a forming station having a material guiding path extending therethrough from a feeding end upstream of said station to a delivery end downstream of said station;

means at said feeding end, for feeding linear chord member forming material into said station along said path, and for feeding flat web forming strip material into said station along said path adjacent said chord member forming material;

said forming station including means for successively forming unit lengths of truss element from said chord and web member forming material comprising:

a. cooperating die sets for shaping unit lengths of supporting web, and b. cooperating welding heads for resistance welding the bends of said one of said sets to said chord member;

means at said delivery end for engaging said formed truss element and for advancing it step by step, in one unit length distances, along said path; and said advancing means including a plurality of latches for engaging respective points of different unit lengths of truss element, whereby said advancing means is operable to advance a continuous truss element having a gap in said chord member.

36. An apparatus according to claim 35 further comprising:

a stop being mounted adjacent said path at said delivery end, said stop movable into the path of said chord member to provide for initial registration thereof, and to control said gap, and said stop being movable out of said path to permit the advancing of said truss element by said advancing means.

37. Apparatus according to claim 35 further comprising a cutoff station positioned downstream of said forming station whereby a plurality of truss elements can be continuously made.

38. A method for continuously making truss elements of arbitrary length, said truss elements having a linear chord member and a supporting web member joined to said chord member, said web member having bends of alternating opposite sets with the bends of one of said sets being welded to said chord member, and said web member being formed of flat strip material shaped to a contoured transverse cross section along the lengths between said bends; said method comprising the steps of:

feeding linear chord member forming material along a predetermined path and feeding flat web-forming strip material along said path adjacent said chord member forming material;

shaping an entire unit length of supporting web to its ultimate shape while in its ultimate position adjacent a corresponding unit length of said chord member, said shaping step including the substep of:

a. shaping a pair of alternate opposite bends in said web, one of said bends being shaped while in position adjacent the point on the chord member to which it will be joined, b. shaping the lengths between said web to a contoured transverse cross section while said bends are maintained in their ultimate positions; and subsequently resistance welding said one of said bends to said point on said chord member.

39. A method according to claim 38 further comprising the step of:

advancing said truss element one unit length along said path between said shaping and welding steps.

40. A method according to claim 39 wherein said advancing step includes the substep of engaging said truss element at a plurality of points one unit length apart whereby said advancing step may proceed when gaps occur in said chord member.

* * * * *